UNITED STATES PATENT OFFICE.

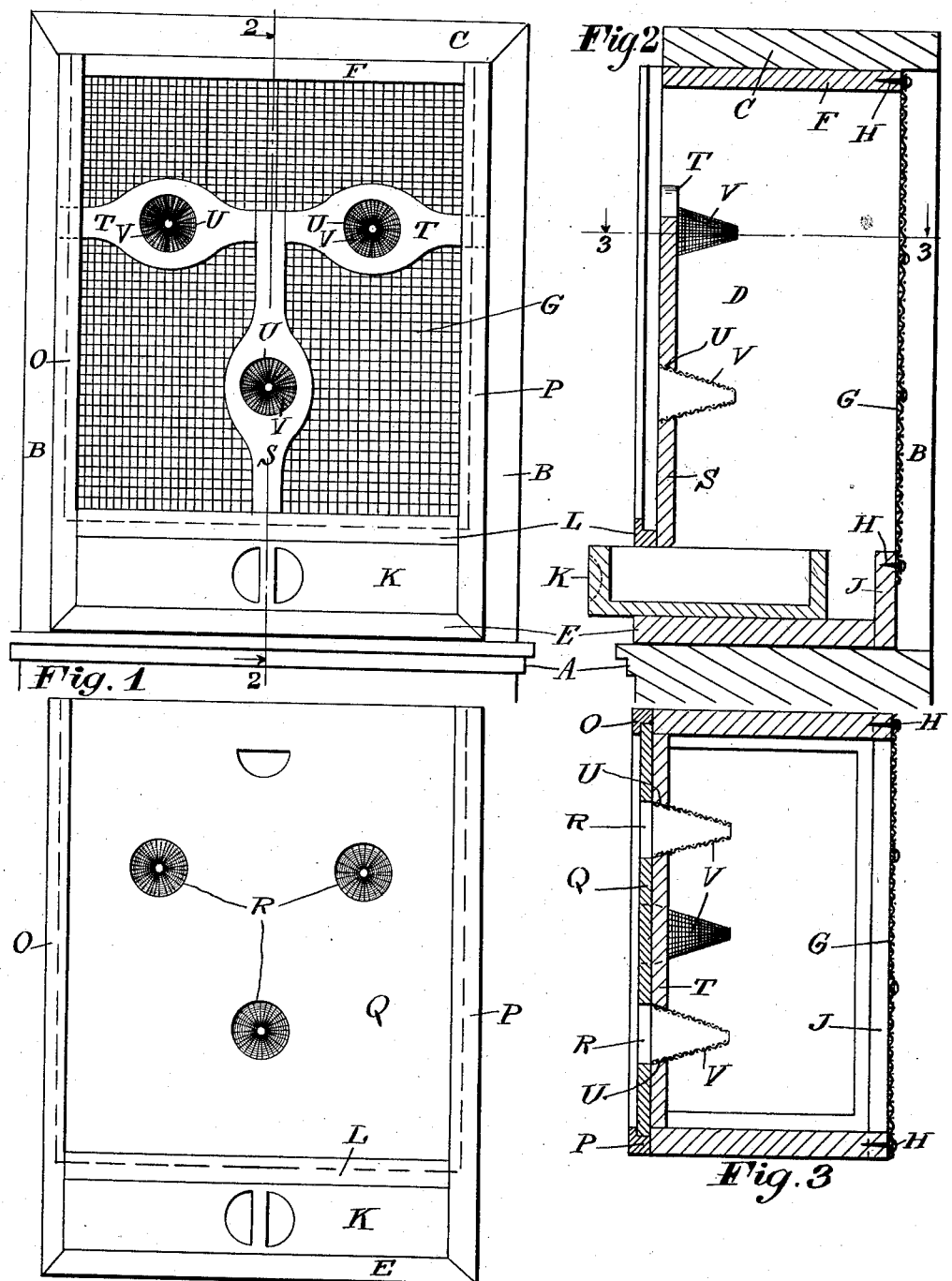

JOHN BURDEN BLANDY, OF FUNCHAL, MADEIRA, ASSIGNOR TO GRAHAM F. BLANDY, OF NEW YORK, N. Y.

INSECT-SCREEN.

1,025,674.   Specification of Letters Patent.   Patented May 7, 1912.

Application filed January 25, 1912. Serial No. 673,365.

*To all whom it may concern:*

Be it known that I, JOHN BURDEN BLANDY, a subject of Great Britain, and a resident of Funchal, Island of Madeira, Portuguese Possession, have invented certain new and useful Improvements in Insect-Screens, of which the following is a specification, accompanied by drawings.

This invention relates to insect screens adapted to be placed in windows and the objects of the invention are to improve upon such devices, simplify their construction, permit ventilation, and afford means for trapping insects as they seek the light to escape from a darkened room.

The screen structure is provided with means for darkening the window opening when desired, except for lighted apertures, through which the insects are induced to pass into the trap, where they may be poisoned or removed at will, without permitting them to reënter the room.

The screen may be applied to dwelling houses, stables, dairy barns or in any other suitable connection and is found particularly useful in preventing flies and other insects from annoying cattle, since a barn may be practically rid of flying insects by properly manipulating the screen.

The accompanying drawings show one preferred form of the device, in which—

Figure 1 is a front elevation of the device with the cover removed; Fig. 2 is a vertical sectional view on line 2—2 of Fig. 1; Fig. 3 is a transverse sectional view on line 3—3 of Fig. 2; and Fig. 4 is a front elevation of the device with the cover closed.

Referring to the drawings, A represents the window-sill, B the sides of the window frame, and C the top rail or lintel forming the window opening in which the insect screen is adapted to be placed. The window may or may not be provided with a sash (not shown) of any suitable construction.

The body portion of the insect screen comprises a box like frame, having the sides D, the bottom E, and the top F suitably secured together. A suitable netting G incloses one side of the box-like frame, being secured to the frame as by means of the tacks H. A strip or rail J extends along the bottom of the box-like frame affording means for securing the netting G thereto and forming a back or stop against which a sliding drawer K abuts in the lower portion of the box-like frame. A front rail or strip L extends across the front of the box-like frame and is connected to upright strips O and P which strips, together with the rail L are rabbeted as shown, to form guides for a sliding cover Q having the apertures R.

A support, preferably a skeleton support to prevent the obstruction of ventilation is arranged inside the box-like frame and comprises the upright member S secured to the rail or strip L and the horizontal members T secured to the sides of the box-like form and to the upper end of the upright support S. This skeleton support comprising the members S and T is provided with the apertures U adapted to register with the apertures R in the cover Q when the cover is closed. The apertures U in the support are provided with the inwardly extending conical insect traps V preferably of netting which permit insects to enter through the enlarged end of the trap, but prevents their reëntry at the smaller end. The support comprising the members S and T as shown is arranged in the opening at the opposite side of the box-like frame from the netting G, so that when the cover Q is closed, said cover is in close proximity and fits against the supports S and T.

In using my improved insect screen, the cover Q may be left raised or open when desired, to obtain the maximum ventilation, in which case the netting G prevents the entry of insects through the window. In order to rid the room or barn of insects, the slides or covers Q are lowered, thus darkening the interior of the room, except for the light penetrating through the openings R in the cover. Insects will seek the lighted openings and entering the traps V will be caught in the box-like frame and fall or crawl into the drawer K, where a suitable poison may be placed to poison the insects. After the room or barn has been rid of the flies or other insects, the covers Q at each window may be again raised or opened, permitting the light to enter, but preventing the entrance of insects through the screens G. The covers Q may be lowered at sunset, for instance, to rid the room of flies before night-fall and in this way the production of milk on a dairy farm, for instance, may be very greatly increased, because the dairy barns may be kept free of insects at practically all times, by properly manipulating the screens. The fly screen constructed in accordance with this invention has been found practical, useful and efficient for the purposes mentioned in actual practice.

Obviously, the invention may be embodied in varying forms and the details of construction need not be adhered to without departing from the spirit of the invention. The cover obviously need not be a sliding cover, although this has been found to be a convenient and suitable construction. The number of openings in the cover may be varied as desired, corresponding to an equal number of openings in the interior auxiliary frame provided with the insect traps. The device may be made in any desired size to fit windows of various sizes, and the device may be placed on the inside or the outside of the window, as desired, whichever position is found most convenient.

I claim and desire to obtain by Letters Patent the following:

1. An insect screen comprising a box-like frame, a netting inclosing one side of the frame, a removable cover for the opposite side of the frame having apertures, and an interior support having apertures registering with the apertures in the cover and provided with conical insect traps extending inwardly.

2. An insect screen comprising a box-like frame, a netting inclosing one side of the frame, a slidable cover for the opposite side of the frame having apertures, and an interior support having apertures registering with the apertures in the cover and provided with conical insect traps extending inwardly.

3. An insect screen comprising a box-like frame, a netting inclosing one side of the frame, a support inside the frame having apertures provided with cone shaped insect traps projecting toward the netting, and a removable cover for the side of the box opposite the netting adapted to fit against said support and having apertures registering with the apertures in said interior support when the cover is in place in the frame.

In testimony whereof I have signed this specification in the presence of two subscribing witnesses.

JOHN BURDEN BLANDY.

Witnesses:
 HENRY WM. HUNT,
 R. C. THRIDGOULD.

---

Copies of this patent may be obtained for five cents each, by addressing the "Commissioner of Patents, Washington, D. C."